United States Patent [19]

Lumbra et al.

[11] 4,417,120

[45] Nov. 22, 1983

[54] PERCUSSIVE ARC WELDING

[75] Inventors: Douglas L. Lumbra, St. Albans; Douglas W. Phelps, Jr., Burlington; Sigvart J. Samuelsen, Burlington; William C. Ward, Burlington, all of Vt.

[73] Assignee: International Business Machines Corporation, Armonk, N.Y.

[21] Appl. No.: 295,476

[22] Filed: Aug. 24, 1981

[51] Int. Cl.³ .......................... B23K 9/10; B23K 9/22
[52] U.S. Cl. ........................................ 219/96; 219/95; 219/98; 219/99; 219/130.01
[58] Field of Search ....................... 219/95, 96, 98, 99, 219/130.01, 130.4, 113, 91.1, 97

[56] References Cited

U.S. PATENT DOCUMENTS

| | | | |
|---|---|---|---|
| 2,814,715 | 11/1957 | Blackmer | 219/95 |
| 3,278,720 | 10/1966 | Dixon | 219/118 |
| 3,360,632 | 12/1967 | Huffman | 219/95 |
| 3,526,748 | 9/1970 | Rienks | 219/130.01 |
| 3,707,614 | 12/1972 | Phillips et al. | 219/97 |
| 3,992,602 | 11/1976 | Ashton | 219/91 |
| 4,035,603 | 7/1977 | Fermicola | 219/121 PT |
| 4,132,879 | 1/1979 | Glorioso | 219/98 |

FOREIGN PATENT DOCUMENTS

| | | |
|---|---|---|
| 2443958 | 7/1976 | Fed. Rep. of Germany . |
| 2743419 | 3/1978 | Fed. Rep. of Germany . |
| 1508485 | 4/1978 | United Kingdom . |

OTHER PUBLICATIONS

American Society of Metals, Metals Handbook, 8th Edition, 1971, vol. 6-Welding and Brazing, pp. 177-180.

Abstract, Japanese 54-119253, 10.18.1978, "Voltage Reducing Apparatus for Stud Welder".

Primary Examiner—Bruce A. Reynolds
Assistant Examiner—Alfred S. Keve
Attorney, Agent, or Firm—Theodore E. Galanthay

[57] ABSTRACT

A method and apparatus for improved percussive arc welding is disclosed. In this technique a test arc of a voltage no greater than the initiating voltage of the percussive arc welding is first applied across the pieces to be welded. The welding cycle is then performed if, and only if, an arc is detected responsive to the impressing of the test voltage.

14 Claims, 1 Drawing Figure

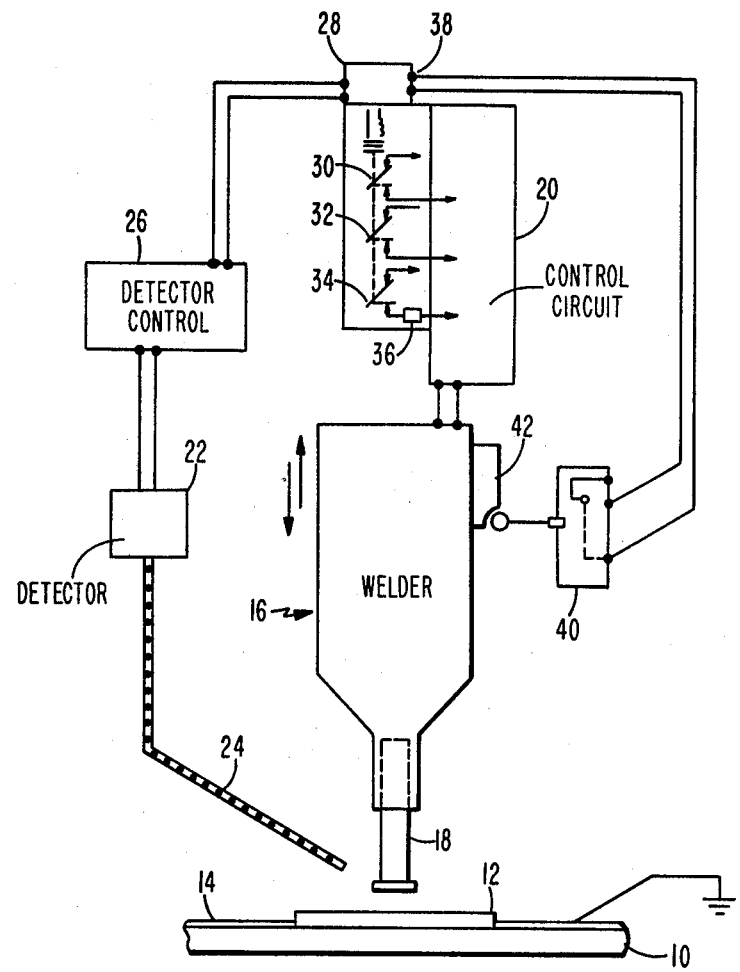

PERCUSSIVE ARC WELDING

BACKGROUND OF THE INVENTION

This invention relates generally to welding of materials, and more particularly to percussive arc welding. More specifically this invention is directed to an improved technique is percussive arc welding a pin member to a base metal.

In percussive arc welding, wherein a pin of some configuration is welded to a base metal, the following sequence of steps is performed by the welding device: the pin to be welded is held by the welding device a given distance from the base metal and an initiating voltage is applied between the pin and the base metal, for the purpose of causing an arc therebetween, the arc establishing a current flow path; after this initiating voltage is applied a capacitive discharge from previously charged capacitors is caused to take place between the pin and the base metal; the capacitive discharge, when following the established arc path between the pin and the base metal is sufficient to cause localized melting of the end of the pin and the region of the base metal around the locus of the termination of the arc; concomitantly with the capacitor discharge the pin is plunged into the base metal, with the melted regions of each joining together and causing a fusion weld.

This technique known as percussive arc welding works very well when all of the steps operate properly. However, it has been observed in many instances surface contaminants of other factors result in poor quality or improper welds due to lack of proper melting of the workpiece. The principal contributing factor to the improper melting was found to be the lack of an arc being established when the voltage was initially applied. The lack of a proper arc at this stage of the process prevented the proper capacitive discharge and consequently prevented proper melting and thus prevented proper welding.

SUMMARY OF THE INVENTION

According to the present invention, in a percussive arc welding technique, a test voltage is first applied between the pin and the base metal, preferably equal to the initiating voltage to be used, but in any event no greater than this voltage. Means are provided to determine if an arc is established. If an arc is established a subsequent welding cycle is allowed to take place. However, if no arc is detected the performance of the welding cycle is prohibited.

DESCRIPTION OF THE DRAWING

The single FIGURE is a schematic view of a percussive welding device for performing percussive arc welding according to this invention.

DESCRIPTION OF THE PREFERRED EMBODIMENT

The present invention will be described in a configuration adapted to weld copper alloy pins to metal pads on a ceramic substrate, which finds are in the semiconductor industry. Its use is not so limited, of course, and can be used wherever percussive arc welding techniques are applicable.

Referring now to the drawing, a workpiece in the form of a ceramic substrate 10 having metal pads one of which is shown at 12 formed theron is provided. Conventionally these pads are tungsten, or molybdenum in the semiconductor industry. A blanket ground metal 14 may be employed to provide grounding of all of the pads 12 as a group.

A conventional percussive arc welder is shown at 16. One very suitable welder for this purpose is Model 528G manufactured by Superior Welder of New Bedford, Massachusetts. The welder 16 is designed to feed and weld copper alloy pins 18 to a metal workpiece. The welder is operated by a welder control 20 which when operated conventionally controls the weld cycle as follows:

First the pin 18 is positioned a predetermined distance from the metal pad to which it is to be welded; thereafter an initiating voltage is impressed between the pin 18 and the pad 12 to cause an arc; thereafter capacitor means are caused to discharged across the arc established to melt the end of the pin 18 and locally melt the pad 12 in the locus of the vicinity of the termination of the arc; concomitantly a driver drives the welding device to plunge the pin into the pad and cause a fusion of the melted metal. However, as indicated above, it frequently happens that no initial arc is establshed when the initial voltage is impressed; and when this happens either a poor weld, or no weld results.

The modification according to this invention prevents the welding cycle from being performed if an arc is not established when a voltage no greater than the initial voltage is applied as a test arc or test voltage. To this end a photodetector or photosensor 22 is provided which has a fiber optic probe 24 positioned to detect the presence or absence of an arc in the space between the pin 18 and the pad 12. The photodetector can be a Model PS 6007 sold by Scanamatic Corporation, Elbridge, New York, 13060. The photodetector in turn is connected to a detector control device 26 which provides an electrical output in response to a signal from the photodetector. This control can be a Model R47100 also sold by Scanamatic Corporation.

The output from the detector control 26 operates a latching relay 28, which is provided with switches 30, 32 and 34 connected to the welder control circuit 20. The switch 30 in its up position is open, and in its down position completes the circuit for the capacitors to discharge in their normal manner. Similarly switch 32 in its up position is open and in its down position closes the circuit to allow a drive mechanism to move the pin downwardly to cause it to contact the pad 12 in its normal manner. Switch 34 is in the arc circuit control which in its up position allows the initiating voltage to be applied, and in its down position is connected through a delay switch 36 also to allow the initiating voltage to be applied. The purpose of the delay switch 36 will be described presently. It is to be understood that the internal controls of the welding circuit operate in their normal manner the only difference being the addition of these switches 30, 32, and 34 in the proper circuits as just described. Since the remainder of the operation of a control of the welding circuit is conventional, it will not be described in detail.

To complete the improvement, the latch relay 28 has a reset switch 38 which is connected to a microswitch 40, the micro-switch 40 being operated by a cam 42 mounted on the welder 16 and movable with welding head.

In operation the latch relay normally holds the switches 30, 32 and 34 in their up positions as shown in solid lines in the drawing. When the welder is activated the switch 34, being in its up position and establishing a circuit for the applied voltage allows the normal initiating voltage to be applied across the pin 18 and the pad 12. This can be considered a test voltage for the purpose of determining whether this voltage will establish an arc between the pin 18 and the pad 12. Assuming, as a first case, that no arc is struck then the detector 22 will sense the absence of an arc and will not operate the latch relay; hence the switches 30, 32 and 34 will remain in their up positions. In these positions the capacitor will not be connected across the pin 18 and the pad 12 since this switch is open; similarly the drive circuit will not be actuated since this circuit also will remain open. If desired an indicator such as a lamp or a buzzer can be connected to indicate the position of the switches 30, 32 and 34. Thus, if the welder were to be again actuated the same sequence would occur, and no weld cycle would take place as long as no arc is detected and the switches 30 and 32 remain in their open positions. Hence, in the absence of an arc when a test voltage is applied a subsequent actuation of the device will not permit a complete weld cycle to take place. In fact only the reapplication of the test voltage will take place.

However, as a second case, assume that when the welder was initially actuated the test voltage did cause an arc between the pin 18 and the pad 12. In this case, the photodetector 22 detects the presence of an arc and through detector control 26 actuates latch relay 28. This moves switches 30, 32, and 34 to their down positions as shown in broken lines. In the down position, switch 34 connects the voltage circuit through time delay 36, switch 32 connects the drive circuit, and switch 30 connects the capacitor discharge circuit. If in this condition the welder is again actuated, the initiating voltage is applied, after delay of, for example, one second between the pin 18 and the pad 12 caused by delay switch 36. The delay is to assure that the capacitors are fully charged. The application of this same voltage as was applied across the arc as a test voltage virtually assures an arc being established since during the test application an arc was established and detected. Since the switches 30 and 32 are in their closed positions to close the capacitive discharge circuits and the driver circuit, respectively, the welder will continue through its normal sequence of operation of capacitive discharge to melt the metals and plunge to the pin to effect a fusion weld.

The movement of the welder 16 to plunge the pin 18 will cause the cam 42 to actuate the microswitch 40. This in turn will reset the latch relay 28 so that after the weld has been accomplished the switches 30, 32, and 34 are returned to their up position and readied for the application of a test voltage before another weld cycle takes place.

It is to be understood that it is convenient and practical to use the same voltage source for applying the test voltage as is used in the welding cycle since this is the voltage source which will actually be used during welding. Also, by utilizing the same source and maintaining the capacitive discharge and drive circuits disconnected after the application of the initiating voltage, repeated operation of the welder can be performed with the repeated application of merely the test voltage and not the welding cycle until the test voltage actually establishes an arc. Afterwards operation of the welder will actually cause the welding cycle to occur. However, it is not necessary to use the same voltage source, all that is required is that the test voltage be not greater than the actual voltage applied during the welding cycle. This requirement, of course, being premised on the fact that test voltage is to determine if an arc can be established at the given voltage used during the weld cycle and if a higher voltage were to be used, it would not indicate that a lower voltage would, in fact, establish an arc.

It should also be understood that other types of materials and configurations can be welded. For example, thermocouples, such as iron constantine, can be welded to devices whose temperatures are to be measured. This is especially useful in the case of materials which are difficult to weld, such as, aluminum. One example of this is the welding of thermocouples to aluminum caps which are used to enclose semiconductor modules for the purpose of testing the thermal characteristics of the caps.

Also, means other than a photodetector can be used to detect the presence or absence of a test arc. For example, a device to monitor current flow, or resistance change, or voltage change between the pieces could be employed.

What is claimed is:

1. In a percussive arc welding device for welding a workpiece to a base piece which device has means for performing a welding cycle which includes means to first apply an initiating voltage between the workpiece and the base piece to establish an arc therebetween, and means to apply a capacitive discharge between the workpiece and base piece after the initiating voltage is applied to melt said pieces, and means to plunge said workpiece into the base piece to effect a weld between the two pieces, the improvement which comprises:

means to apply a test voltage of no greater value than said initiating voltage of the welding cycle between said workpiece and said base piece prior to the initiation of said welding cycle, to initiate a test arc between the two workpieces, detector means to detect whether an arc is established between said pieces by said test voltage, and means to inhibit the performance of the weld cycle if the establishment of an arc by the test voltage is not detected by said detector means.

2. The invention as defined in claim 1 wherein said detector means includes photodetector means.

3. The invention as defined in claim 1 wherein the means to prevent the performance of the welding cycle includes switch means in circuit relationship with said welding device operable by said detector means to selectively allow or inhibit the performance of the weld cycle.

4. The invention as defined in claim 1 wherein said means to apply a test voltage includes the means to apply the same voltage as said initiating voltage.

5. The invention as defined in claim 3 further comprising: reset means operative responsive to the completion of the welding cycle to reset the switch means.

6. The invention as defined in claim 5 wherein said reset means includes a cam follower operated microswitch responsive to the movement of the welding device during the plunging of the workpiece.

7. The invention as defined in claim 1 wherein delay means are provided for providing initiating voltage after the test voltage has been applied and a test arc has been initiated and detected.

8. The invention as defined in claim 1 wherein both the capacitive discharge and plunge of the workpiece are prevented in the absence of a detected arc responsive to the test voltage.

9. The invention as defined in claim 1 including means to maintain the device in condition to reapply the test voltage after the non-detection of an arc by the test voltage.

10. In the method of percussive arc welding a workpiece to a base piece wherein the welding cycle includes first applying an initiating voltage between the workpiece and the base piece to establish an arc therebetween, and thereafter a capacitive discharge is established between the workpiece and the base piece which will cause melting of the pieces, and the workpiece is plunged into the base piece to effect a weld between the two pieces, the improvement which comprises:

prior to the initiation of the welding cycle applying a test voltage between the workpiece and the base piece of no greater value than the initiating voltage of the welding cycle thereby generating an arc and, detecting whether an arc is established between the workpiece and the base piece by the test voltage, and thereafter inhibiting the performance of the weld cycle if the establishment of an arc by the test voltage is not detected.

11. The invention as defined in claim 10 wherein the same voltage is applied as a test voltage as is used in the weld cycle.

12. The invention as defined in claim 10 wherein the detection of an arc produced by the test voltage is performed by a photodetector.

13. The invention as defined in claim 10 wherein switch means are provided which operate responsive to the detection of an arc produced by the test voltage to selectively allow or inhibit the performance of the welding cycle.

14. A method of percussive arc welding a conductive pin to a conductive pad, comprising the steps of:

positioning the pin a predetermined distance from the metal pad to which it is to be welded;

generating an arc by applying a test voltage to said pin and pad, the test voltage being of no greater value than the initiating voltage of a weld cycle;

detecting the presence of said arc; and applying the initiating voltage of a weld cycle to said pin and pad only if an arc is detected.

* * * * *